Patented Mar. 19, 1940

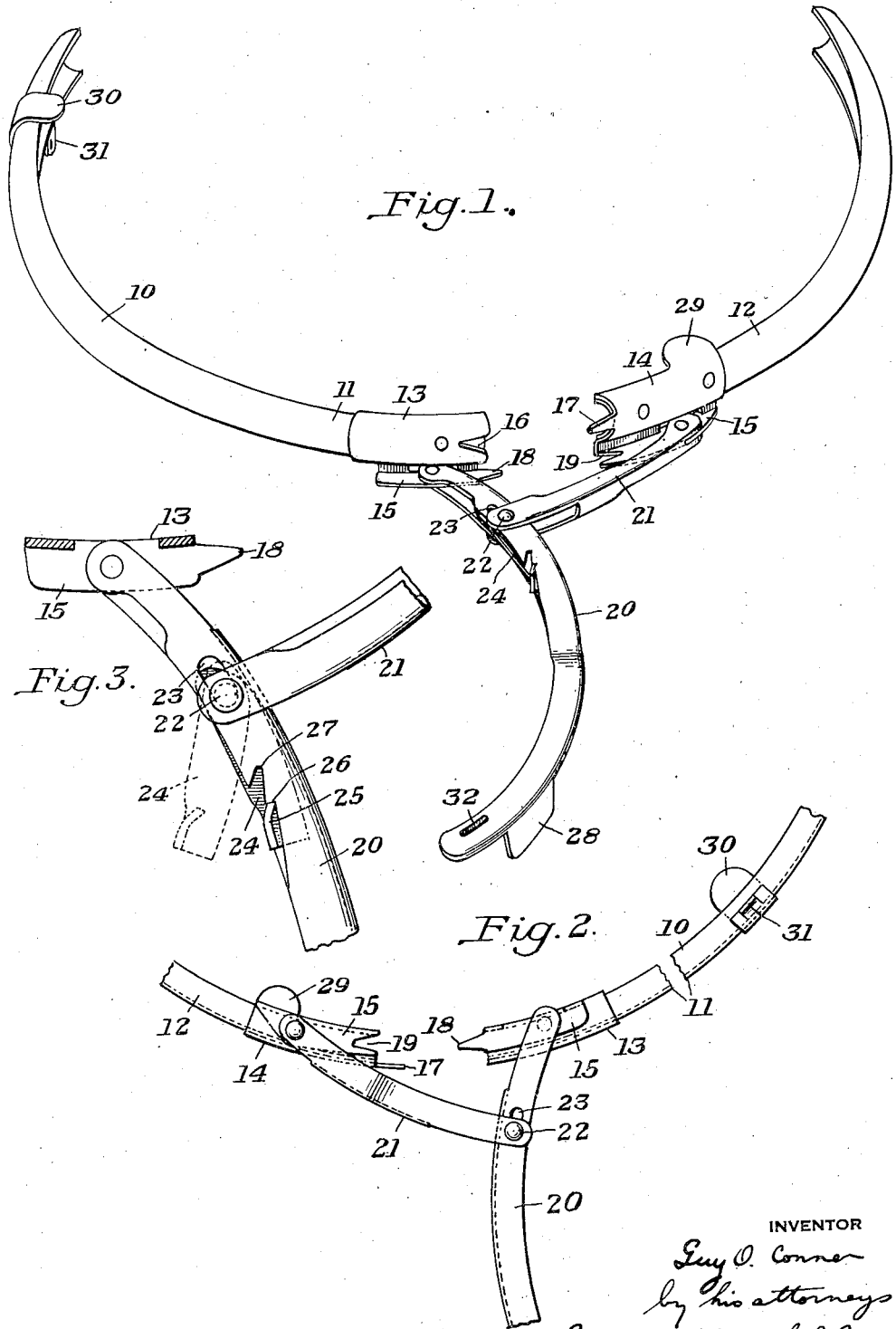

2,194,162

UNITED STATES PATENT OFFICE 2,194,162

CLAMPING RING

Guy O. Conner, Wheeling, W. Va., assignor to Wheeling Steel Corporation, Wheeling, W. Va., a corporation of Delaware Application August 21, 1936, Serial No. 97,297

4 Claims. (Cl. 220—61)

This invention relates to a clamping ring such as employed for securing a closure having a peripheral bead on the open end of a container having a false wire therearound.

While clamping rings for this application have been used previously, they have been open to certain objections, and it is an object of my invention, therefore, to improve generally upon the design and construction of clamps of this character.

In accordance with my invention, I provide a split clamping ring having links pivoted to the opposed ends thereof and to each other, whereby collapsing of the links causes the ends of the ring to be drawn together. I provide cooperating interfitting projections and recesses on the opposed ends for guiding them into proper relative position as they approach each other. I also provide means for adjusting the connection between the lengths whereby to vary the extent to which the ends of the ring are drawn together. Various other features of novelty will be explained in detail in the course of the following description and pointed out specifically in the appended claims.

A present preferred embodiment of the invention is illustrated in the accompanying drawing in which, Fig. 1 is a perspective view partly broken away, showing the ring with its parts in position to be applied to a container;

Fig. 2 is a partial bottom plan view; and

Fig. 3 is a view partly in section and partly in plan illustrating the adjustable feature of the ring.

Referring in detail to the drawing, a split clamping ring 10 of arcuate section has opposed ends 11 and 12. Clips 13 and 14 are riveted to the ends 11 and 12. Each of the clips has a rounded portion conforming to the curvature of the ring 10 and an outwardly projecting flange 15. The clip 13 has an end recess or notch 16, while the clip 14 has a projection 17 adapted to fit therein when the ends are brought together. The flange 15 of the clip 13 has a projection 18 cooperating with a recess 19 in the end of the flange 15 on the clip 14. The cooperating projections and recesses 16 through 19 serve to aline the ends 11 and 12 in both horizontal and vertical planes as the ends are drawn together.

A link 20 is pivoted to the flange 15 of the clip 13. A link 21 is similarly pivoted to the flange 15 of the clip 14. The links are of steel plate pressed into channel section. A pivotal connection between the links is provided by a pin 22 extending through the bifurcated end of the link 21 and a slot 23 in the ring 20. The pin 22 also extends through a slide 24 movable between the sides of the channel forming the link 20. The slide 24 has an inwardly bent tip 25 adapted to engage with teeth 26 and 27 in one side of the link 20 whereby the slide and the pin 22 are positioned relative to the link.

It will be apparent that the ends 11 and 12 of the ring 10 will be drawn together as the link 20 is swung around toward the end 11. The extent to which the ends 11 and 12 are brought together by this movement depends on whether the tip 25 of the slide 24 engages the tooth 26 or the tooth 27. If the former, the ends 11 and 12 are brought tightly together. If the latter, the ends 11 and 12 are drawn toward each other only lightly.

One side of the channel forming the link 20 is bent downwardly as at 28 to form a hand grip whereby the swinging of the link 20 is facilitated.

A lug 29 integral with the clip 14 extends inwardly on the ring 10. Additional lugs 30 may be secured to the ring in spaced relation thereto. These lugs support the ring temporarily on a closure which is to be secured thereby. The lug 30 has a depending tip 31 adapted to enter an eye 32 in the end of the link 20 when the latter is swung around under the end 11 of the ring 10, to hold it in position. The link 10 is bent downward slightly to permit the tip 31 of the lug 30 to enter the eye 32.

The purpose of providing an adjustable connection between the links 20 and 21 is to permit closures to be lightly secured to receptacles, such as pails or drums, while the latter are being delivered to the user who fills them for shipment. After filling, a tight seal is desired between the closure and the container, and the slide 24 is, therefore, shifted from the notch or tooth 27 to the notch 26. This "shortens the hitch" between the links and, therefore, draws the ends 11 and 12 more firmly together than when the slide tip 25 engages the tooth 27.

It will be apparent from the foregoing description that the invention provides a clamping ring having numerous features of novelty and advantage compared to those previously known. The ring can be manufactured at low cost, and yet serves as a highly effective means for sealing a closure on a container. When the ring is contracted, the link 20 lies entirely under the end 11 and no portion of the mechanism projects beyond the latter. It is not necessary, therefore, that the rolling hoop of a drum or other container be very deep to protect the ring from injury while the drum is being rolled. The interfitting projections and recesses guide the opposed ends of the ring accurately into proper relative position in both horizontal and vertical planes, and the closing link is locked in closed position against accidental opening.

While I have illustrated and described but a preferred form of the invention, it will be understood that changes in the precise construction shown may be made without departing from the spirit of the invention or the scope of the appended claims.

I claim:

1. A split clamping ring having opposed ends adapted to be drawn together, a link pivoted to each of said ends, a slide bar movable along one of said links, and means for holding said slide bar in different positions on said one of said links, the other of said links being pivoted to said slide bar, whereby to vary the degree of contraction of said ring effected by operating one of said links as a lever.

2. The apparatus defined by claim 1 characterized by separately formed clips attached to said ends, said clips having curved portions overlying said ends and outwardly extending flanges therebelow, to which said links are pivoted.

3. A split clamping ring having opposed ends adapted to be drawn together, a link pivoted to each of said ends, at least one of said links being of channel section, and a slide bar movable in said one of said links, the sides of the link having notches and said bar having a detent cooperating therewith to hold said bar in different positions on said one of said links, the other of said links being pivoted to said bar, whereby the contractile effect exerted on said ring by operating one of said links as a lever may be varied.

4. A split clamping ring having collapsible links pivoted to the opposed ends thereof and to each other, and cooperating interfitting means including a projection extending outwardly beyond one end and a recess opening inwardly from the other to guide the ends into proper relative position in one plane on collapsing said links to draw said ends together, a second projection extending outwardly beyond one end and a second recess opening inwardly from the other for alining said ends in a plane at an angle to said first-mentioned plane.

GUY O. CONNER.